May 15, 1962 W. P. CONNELLY 3,034,649
AUTOMATIC WITHDRAWAL OF HIGH DENSITY MATERIAL
FROM A HEAVY MEDIA SEPARATOR
Filed Oct. 4, 1960
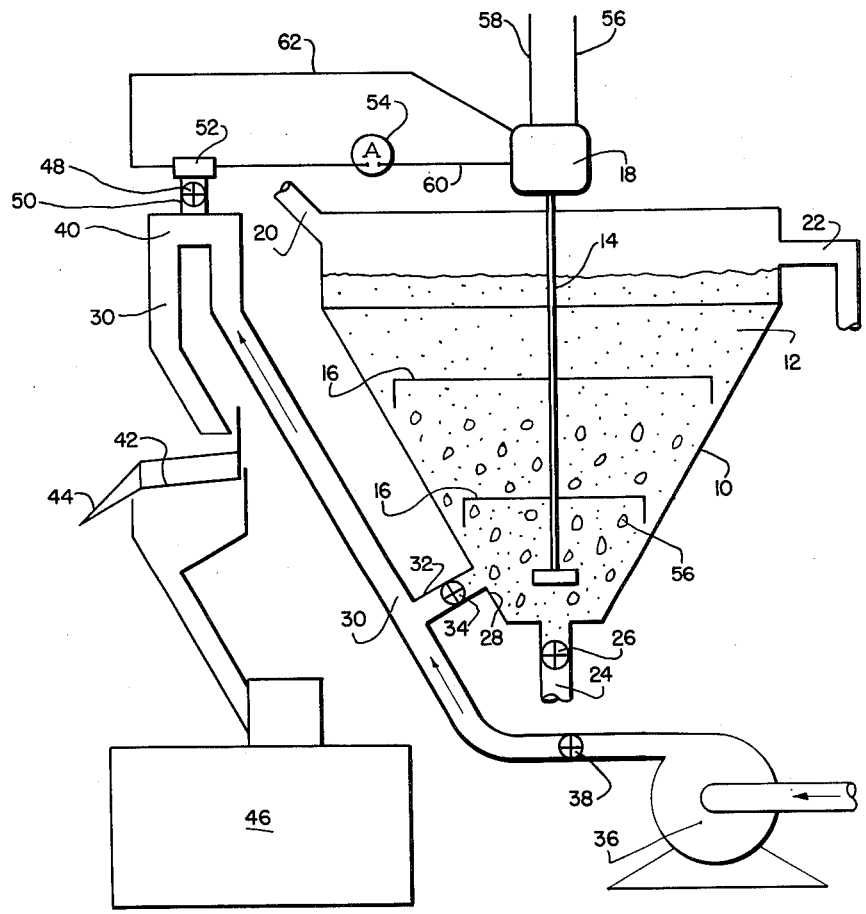
INVENTOR.
WILLIAM P. CONNELLY
BY *Stanley J Price*
*his* ATTORNEY

3,034,649
AUTOMATIC WITHDRAWAL OF HIGH DENSITY MATERIAL FROM A HEAVY MEDIA SEPARATOR

William P. Connelly, Cadiz, Ohio, assignor to Consolidation Coal Company, Pittsburgh, Pa., a corporation of Pennsylvania
Filed Oct. 4, 1960, Ser. No. 60,333
5 Claims. (Cl. 209—172.5)

The present invention relates to the withdrawal of high density material from a heavy media separator, and more particularly to selectively creating a siphon to withdraw high density material that has accumulated at the bottom of a heavy media separator vessel.

In a heavy media separator, the material to be separated is introduced near the top of the vessel at the surface of a quantity of the heavy media fluid. Low specific gravity material floats upon the surface of the media while high specific gravity material sinks to the bottom of the vessel and the material is thus separated. In the coal mining industry, this type of separator is utilized to separate coal from the rock and slate with which the coal is mixed when mined. During the mining process, coal, rock, and slate are indiscriminately taken from the mine and they must then, at some later time, be separated into the useful coal product and the refuse materials, rock and slate. Since the coal is of much lower density than the rock and slate, the separation is efficiently accomplished in a heavy media separator.

The heavy media separator usually consists of a conical vessel which is filled with a dense, heavy media fluid. The heavy media fluid is formed from sand or other finely divided materials suspended in water. Sand and water are added in controlled quantities to maintain the desired density within the vessel during the separating operation. In order to maintain the sand in suspension in the water to thereby form a homogeneous heavy media fluid, an agitator is usually provided in the separator vessel to continuously agitate the mixture of sand and water.

In recent years, efforts have been made toward providing heavy media separators with continuous withdrawal of the high density material that sinks to the bottom of the vessel. Earlier heavy media separators utilized a system of batch withdrawal of the high density material. In batch withdrawal of the high density material, a quantity of high density material was collected in the bottom of the separating vessel and, periodically, a hopper at the bottom of the vessel was opened to allow the collected quantity of high density material to be withdrawn from the vessel. It was found that with batchwise withdrawal of the high density material, the separating system within the vessel was upset and separation of the raw product could not be efficiently carried on while the high density material was removed in batches. With continuous withdrawal of the high density material, on the other hand, a more efficient separation of the raw product was possible.

When large quantities of high density material accumulate in the bottom of the separating vessel, they tend to clog the flow of other high density material toward the bottom of the vessel. Thus, if high density material accumulates for any lengthy period of time, the high density material contained in subsequently added batches of the raw product cannot find its way to the bottom of the vessel readily and, instead, the subsequently added high density material remains on the upper surface of the vessel and is recovered with the useful product. Accordingly, in order to maintain efficient separation of the low density material and the high density material within the separator vessel, the separator vessel must be kept free of accumulations of high density material in the bottom of the separator vessel.

While the continuous withdrawal of high density material from the bottom of the separator vessel was a major advance over the withdrawal in batch quantities of this material, it was found that on occasion the high density material would accumulate in the bottom of the vessel faster than it could be withdrawn by the continuous withdrawal system. On such occasions efficiency of the heavy media separator was reduced and operating difficulties were incurred. The present invention is directed to a system of continuous withdrawal of high density material from a heavy media separator wherein the high density material can be periodically removed from the separator vessel at higher flow rates and with greater force than is prevalent during the continuous withdrawal. This periodic flushing of the high density material from the bottom of the separator vessel prevents clogging of the vessel and facilitates efficient separation of the high and low density materials within the separator vessel.

To practice the present invention, the continuous withdrawal of high density material from the separator vessel is accomplished through a conveying conduit which utilizes flowing liquid to carry the high density material through the conveying conduit. The conveying conduit of the present invention is formed with an inverted U-shaped bend at its highest point and it then extends downwardly from the U-shaped bend to the high density material receiving means such as a refuse screen or the like. At the U-shaped bend within the conveying conduit, an air vent line and an air vent valve are provided to admit controlled amounts of ambient air into the conveying conduit. The construction of the conveying conduit is such that when ambient air is completely excluded from the conveying conduit, a siphon is created which draws the heavy media and high density material out of the separator vessel and through the conveying conduit.

During normal operation of the separator vessel, the air vent valve is positioned so that air is admitted into the conveying conduit and the siphon is destroyed. Thus the flowing liquid through the conveying conduit serves as the sole means for propelling the high density material through the conveyor conduit. When a condition exists within the separator vessel which indicates that there is an accumulation of high density material at the bottom of the vessel, the air vent valve may be closed to completely exclude air from the conveying conduit. When the air vent valve is closed, a siphon is created within the conveying conduit which serves to forcefully draw the high density material and the heavy media from within the separator vessel into and through the conveying conduit with greater force than is created by the flowing liquid in the conveyor conduit. The siphon effect serves to unclog the accumulation of high density material within the bottom of the separator vessel so that the separator vessel may operate efficiently to separate the high and low density materials.

In order to determine when an excess of high density material has accumulated within the separator vessel, the agitator of the separator vessel is provided with a sensing element which indicates when the agitator becomes difficult to turn. When the agitator is difficult to turn, the difficulty is due to the accumulation of high density material within the vessel which impedes rotation of the agitator. Thus, by sensing the ease of rotation of the agitator, an indication of the accumulation of high density fluid within the separator vessel can be had.

In the present invention, an electric motor is preferably utilized to drive the agitator. An amperage sensing element can be utilized to determine the power requirement to the electric motor. When the power requirement to the electric motor is high, the agitator is being impeded in its rotation and the high amperage requirement is, then, synonymous with an accumulation of high density material within the bottom of the separator vessel. In a preferred construction of the system of the present invention, the high amperage indication from the agitator drive motor is utilized to actuate the air inlet valve to create a siphon within the high density material conveying conduit. Thus, when there is an accumulation of high density material within the separator vessel as indicated by the high amperage on the motor, a siphon is created to clear the high density material and permit the separator vessel to again efficiently separate the high density material from the low density material.

With the foregoing considerations in mind, it is a primary object of the present invention to provide an improved system of high density material withdrawal from a heavy media separator.

Another object of this invention is to provide an improved system for continuous withdrawl of high density material with periodic flushing of the high density material from the separator vessel.

Another object of this invention is to provide a system of high density material withdrawal which senses a clogging effect in the separator vessel and operates to correct this clogging condition.

Another object of this invention is to provide a system of high density material withdrawal wherein a siphon is periodically created in the conveyor conduit to increase the flow rate through the conduit.

Another object of this invention is to provide a system of high density material withdrawal wherein the amount of power required to drive the agitator within the separator vessel controls the creation of a siphon in the conveyor conduit outlet to increase the flow rate through the conveyor conduit.

These and other objectives achieved by this invention will become apparent as this description proceeds in conjunction with the accompanying drawing.

The drawing is a schematic representation of a heavy media separator equipped with the high density material withdrawal system of the present invention.

Referring to the drawing, an inverted conical vessel 10 has a quantity of heavy media fluid 12 therein. The heavy media fluid 12 is preferably a mixture of sand and water maintained in suspension by rotation of the agitator 14. The agitator 14 has a plurality of radially extending agitator arms 16 fixed thereto. The agitator is driven by an electrical agitator drive motor 18 drivingly connected to the top of the agitator 14.

The heavy media 12 within the vessel 10 is maintained, in conventional fashion, by introducing a slurry of sand at the top of the vessel 10 through a sand inlet port (not shown) and introducing clear water into the conical vessel 10 through a series of water inlets (not shown) disposed along the conical surface of the vessel. The amounts of water and sand introduced into the vessel 10 are closely controlled to maintain the desired density of the heavy media 12.

The vessel 10 has a raw coal inlet 20 through which the raw coal including the high density waste materials is introduced into the separator vessel and onto the surface of the heavy media fluid 12. A cleaned coal outlet 22 is provided diametrically opposite the raw coal inlet 20 so that the cleaned coal which floats upon the surface of the heavy media 12 may pass from the conical vessel 10 through the outlet 22. As the low density clean coal floats across the surface of the heavy media fluid 12, the high density material sinks through the heavy media fluid 12 to the bottom of vessel 10.

The inverted conical vessel 10 has a drain outlet 24 provided at its bottom and closed by a normally closed drain outlet valve 26. By opening the outlet valve 26 the entire contents of the vessel 10 may be drained through outlet 24 so that the vessel may be shut down for maintenance and repair.

A high density material outlet 28 is provided adjacent the apex end of the conical vessel 10 to permit the high density material which sinks through the heavy media fluid 12 to be withdrawn continuously from the vessel 10. A conveying conduit 30 runs upwardly along the outside of the vessel 10 and is connected to the high density material outlet 28 by a connecting conduit 32. Connecting conduit 32 contains a shut-off valve 34 which is normally open but which may be closed when the separator vessel is not in use. The shut-off valve 34, when closed, prevents the heavy media fluid 12 from draining out of the vessel when the separator vessel is not in operation.

Conveying liquid is pumped upwardly through the conveying conduit 30 by a pump 36 from a source of conveying liquid (not shown) so that a flowing stream of conveying liquid continuously passes through conveying conduit 30 past the connecting conduit 32. A control valve 38 is provided in the conveying conduit 30 to control the flow of conveying liquid through conduit 30.

At its highest point, the conveying conduit 30 is formed into an inverted U-shaped bend 40 and from bend 40 conduit 30 is directed downwardly to a high density material receiving screen 42. The high density material receiving screen 42 is adapted to receive the high density material conveyed through conduit 30 and separate any water and sand which may be clinging to the high density material for reuse in the conical separator vessel 10. Thus, the high density material remains on top of the screen 42 and is conveyed through the high density material outlet 44 of screen 42. Any water and sand which may be clinging to the high density material and the excess of conveying liquid which flows through conduit 30 passes through the screen 42 and into a sand and water sump 46 which receives the sand and water. The sand and water from sump 46 may be conducted by suitable conduits (not shown) back into the conical vessel 10 to be utilized as needed.

Adjacent the inverted U-shaped bend 40 in conveying conduit 30 an air inlet valve 48 is disposed within an air inlet passage 50 which communicates with the inverted U-shaped bend 40. When air inlet valve 48 is closed, no air may pass into the conveying conduit 30 and a siphon is created within the conveying conduit 30 since the elevation of the fluid within vessel 10 is substantially higher than the elevation of the outlet of conduit 30 which is disposed adjacent to high density material receiving screen 42. A valve positioner 52 is provided to control the position of air inlet valve 48. Valve positioner 52 may be of any commercially available type such as a pneumatic or an electrical valve positioner. Preferably, valve positioner 52 is an electrically responsive positioner which will close air inlet valve 48 in response to a high amperage passing through positioner 52 and open valve 48 when a low amperage condition exists in the positioner 52. An ammeter 54 is provided in series with valve positioner 52 to indicate to an observer the amperage passing through the positioner 52.

As shown schematically in the drawing, electrical motor inlet lines 56 and 58 are provided to conduct electrical current from a source (not shown) to the electrical motor 18 which drives the agitator 14. Electrical lines 60 and 62 connect the valve positioner 52 with the armature of motor 18 so that when a high amperage current flows in the armature of motor 18 this high amperage current is indicated on ammeter 54 and passes through the valve positioner 52 to close air inlet valve 48. On the other hand, when there is a low amperage in the armature of motor 18, air inlet valve 48 remains open thereby destroying the siphon effect within the conveying conduit 30.

With the foregoing arrangement of the components in mind, the operation of the high density material withdrawal system of the present invention may be considered in detail. Raw coal is conducted into the separator vessel 10 through raw coal inlet 20 and the low density coal floats across the surface of the heavy media fluid 12 while the high density material sinks through the heavy media 12 into the bottom of the conical vessel 10. The low density, valuable coal product is recovered through the clean coal outlet 22 from the surface of the heavy media fluid 12. The pump 36 causes a current of conveying liquid to pass upwardly through the conveying conduit 30 over the inverted U-shaped bend 40 and down onto the high density material receiving screen 42. As the high density material sinks through the heavy media fluid 12 within the vessel 10 it passes out of the vessel 10 through high density material outlet 28 and connecting conduit 32 into the flowing stream of conveying liquid within the conveying conduit 30. The normally opened shut-off valve 34 is open and the air inlet valve 48 is open so that there is no siphon effect created within the conveying conduit 30. The high density material is carried upwardly through the conveying conduit 30 solely by the flowing stream of conveying liquid and deposited upon the high density material receiving screen 42. The foregoing is descriptive of the normal operation of the separating vessel with continuous withdrawal of the high density material.

On occasion, the rate of deposit of the high density material in the bottom of the vessel 10 will be greater than the rate of withdrawal through the conveying conduit 30. In such instances, the high density material will begin to collect in the bottom of the vessel 10. An accumulation of high density material in the bottom of the vessel 10 reduces the efficiency of the separator vessel as has been discussed. Further, the accumulation of the high density material impedes rotation of the agitator 14 which is maintained within the vessel to suspend the sand within the water of the heavy media 12. When the rotation of agitator 14 is impeded, more power is required by motor 18 to rotate the agitator 14. This additional power is discernable by an increase in the amperage within the armature of motor 18.

When the amperage within motor 18 is increased beyond a predetermined minimum amount, a high amperage current flows in the circuit of electrical line 60, ammeter 54, valve positioner 52, and electrical line 62. This high amperage current causes the valve positioner 52 to close valve 48, thereby preventing air from entering the U-shaped bend 40 of conveyor 30. When the air inlet valve 48 is closed, a siphon effect is created within the conveying conduit 30 thereby causing material to be drawn out of the inverted conical vessel 10 through connecting conduit 32, through the conveying conduit 30, up over the inverted U-shaped bend 40, and causing the material to be deposited upon the high density material receiving screen 42. The siphon effect within the conduit 30 accelerates the withdrawal of material from the conical vessel 10 since, in addition to the force created by pump 36 to cause a flow of liquid upwardly through conveying conduit 30, the siphon effect causes an increased rate of flow within conveying conduit 30.

When the accumulated high density material within the separator vessel 10 is withdrawn through the conveying conduit 30 because of the siphon effect, the agitator 14 again turns more freely and a lowered power requirement appears as a reduced amperage in the armature of motor 18. The reduced amperage in the armature of motor 18 causes valve positioner 52 to position air inlet valve 48 to the open position to permit air to enter the inverted U-shaped bend 40 of conveying conduit 30. Accordingly, the siphon effect within the conveying conduit 30 is destroyed and the high density material is conveyed out of the conical vessel 10 at the normal rate controlled by the flow of conveying liquid from pump 36 through conveying conduit 30. It will be noted that the system of the present invention provides continuous withdrawal of high density material from the bottom of the separator vessel 10 during all normal operation of the vessel 10. On those occasions when excessive amounts of high density material accumulate in the bottom of vessel 10, a supplementary flushing action will be caused by the siphon effect in conduit 30 which draws the high density material out of the separator vessel 10 at an increased rate. Accordingly, the vessel may maintain efficient separation of high and low density materials since high density material will never be allowed to accumulate to the extent that it impedes downward passage of subsequently added high density material in the vessel 10.

While the present invention has been described in detail with electrical controls for the motor 18 and the valve positioner 52, it is within the scope of the present invention to provide pneumatic, hydraulic, or combinations of electrical, pneumatic and hydraulic controls to close the valve 48 in response to increased power requirements to turn agitator 14 and to open valve 48 when the power required to turn agitator 14 is reduced.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A heavy media separator comprising an inverted conical vessel containing an inventory of heavy media fluid, a high density material outlet means in said vessel adjacent the apex end of said vessel, a high density material conveying conduit extending upwardly outside said vessel and positioned adjacent said vessel, said conduit connected at its lower end to a source of conveying liquid, means placing said conveying conduit in communication with said vessel high density material outlet means so that high density material from said vessel can be carried through said conduit by said conveying liquid, said conveying conduit having an inverted U-shaped bend at its highest point and extending downwardly from said bend to an elevation below the surface of said heavy media fluid inventory and adjacent a high density material receiving means, a control valve in said conveying conduit to control the flow of said conveying liquid through said conduit, an air inlet valve positioned within said conveying conduit inverted U-shaped bend and operable to selectively admit air to said conduit, said air inlet valve adapted to be positioned to exclude air from said conduit to siphon said heavy media and high density material from said vessel and thereby accelerate removal of said high density material when large quantities of said high density material accumulate adjacent said outlet means.

2. A heavy media separator comprising an inverted conical vessel containing an inventory of heavy media fluid, an agitator positioned within said vessel to maintain said heavy media fluid in suspension, motor means to drive said agitator, a high density material outlet means in said vessel adjacent the apex end of said vessel, a high density material conveying conduit extending upwardly outside said vessel and positioned adjacent said vessel, said conduit connected at its lower end to a source of conveying liquid, connecting conduit means joining said conduit and said vessel high density material outlet means so that high density material from said vessel can be carried through said conveying conduit by said conveying liquid, said conveying conduit having an inverted U shaped bend at its highest point and extending downwardly from said bend to an elevation below the surface of said heavy media fluid inventory and adjacent a high density material receiving means, said high density material receiving means being below the elevation of the surface of said heavy media fluid within said vesel, a control valve in said conveying conduit to control the flow of said conveying liquid through said conveying conduit, an air inlet valve positioned within said conveying conduit inverted U shaped bend and operable to selectively admit air to said conveying conduit to destroy any siphon effect in said conveying conduit or to exclude air from said conveying conduit to thereby create a siphon effect to increase the rate of removal of said high density material from within said vessel, valve positioner means adapted to control said air inlet valve, sensing means on said motor means to determine power output of said motor means, said valve positioner means adapted to close said air inlet valve to exclude air from said conveying conduit upon a high power output signal from said sensing means on said motor means, said high power output signal occurring when the rotation of said agitator means is impeded by a large quantity of high density material within said vessel.

3. A heavy media separator comprising an inverted conical vessel containing an inventory of heavy media fluid, an agitator positioned within said vessel to maintain said heavy media fluid in suspension, electrical motor means to drive said agitator, a high density material outlet means in said vessel adjacent the apex end of said vessel, a high density material conveying conduit extending upwardly outside said vessel and positioned adjacent said vessel, said conduit connected at its lower end to a source of conveying liquid, connecting conduit means joining said conduit and said vessel high density material outlet means so that high density material from said vessel can be carried through said conveying conduit by said conveying liquid, said conveying conduit having an inverted U shaped bend at its highest point and extending downwardly from said bend to an elevation below the surface of said heavy media fluid inventory and adjacent a high density material receiving means, a control valve in said conveying conduit to control the flow of said conveying liquid through said conveying conduit, an air inlet valve positioned within said conveying conduit inverted U shaped bend and operable to selectively admit air to said conveying conduit to destroy any siphon effect in said conveying conduit or to exclude air from said conveying conduit to thereby create a siphon effect to increase the rate of removal of said high density material from within said vessel, electrical valve positioner means adapted to control said air inlet valve, amperage sensing means on said motor means to indicate power output of said motor means, said electrical valve positioner adapted to close said air inlet valve to exclude air from said conveying conduit upon a high amperage signal from said amperage sensing means, said high amperage signal occurring when rotation of said agitator means is impeded by a large quantity of high density material within said vessel, the closing of said air inlet valve causing a siphon to be created in said conveying conduit to accelerate the withdrawal of high density material out of said vessel.

4. The method of withdrawing high density material from a heavy media separator having an inverted conical vessel with a high density material outlet adjacent its apex end, an upwardly extending conveying conduit disposed exteriorly of said vessel and having an inverted U shaped bend at its highest point with a downwardly extending leg extending to an elevation below the elevation of the fluid surface within said vessel, said conveying conduit being joined to said high density material outlet, a source of conveying liquid connected to the lower end of said conveying conduit, and an air inlet valve positioned within said conveying conduit inverted U shaped bend and operable to selectively admit air to said conduit or to exclude air from said conduit, said method comprising the steps of opening said air inlet valve and thereby permitting said high density material to pass into said conveying conduit to be carried only by said conveying liquid through said conveying conduit, periodically closing said air inlet valve to create a siphon in said conveying conduit thereby accelerating withdrawal of said high density material from said vessel through said conveying conduit when said high density material accumulates in said vessel, and opening said air inlet valve to destroy said siphon after said accumulated high density material has been drawn out of said vessel.

5. The method of withdrawing high density material from a heavy media separator having an inverted conical vessel with a high density material outlet adjacent its apex end, an agitator positioned within said vessel motor means to drive said agitator, an upwardly extending conveying conduit disposed exteriorly of said vessel and having an inverted U shaped bend at its highest point with a downwardly extending leg extending to an elevation below the elevation of the fluid surface within said vessel, said conveying conduit being joined to said high density material outlet, a source of conveying liquid connected to the lower end of said conveying conduit, and an air inlet valve positioned within said conveying conduit inverted U shaped bend and operable to selectively admit air to said conduit or to exclude air from said conduit, said method comprising the steps of opening said air inlet valve thereby permitting said high density material to pass into said conveying conduit to be carried only by said conveying liquid through said conveying conduit, determining the power requirements of said agitator drive motor means, closing said air inlet valve when said motor power requirements are high to create a siphon in said conveying conduit thereby accelerating withdrawal of said high density material from said vessel when said high density material accumulates in said vessel, and again opening said air inlet valve to destroy said siphon when said agitator drive motor means has a reduced power requirement indicating that said accumulated high density material has been drawn out of said vessel by said siphon.

References Cited in the file of this patent

UNITED STATES PATENTS

| | | |
|---|---|---|
| 2,714,958 | Evans | Aug. 9, 1955 |
| 2,766,886 | Martin | Oct. 16, 1956 |
| 2,899,056 | Evans | Aug. 11, 1959 |